United States Patent
Tashiro et al.

(10) Patent No.: US 10,792,947 B2
(45) Date of Patent: Oct. 6, 2020

(54) OPTICAL STRUCTURE

(71) Applicant: TOPPAN PRINTING CO., LTD., Tokyo (JP)

(72) Inventors: Tomoko Tashiro, Tokyo (JP); Toshiki Toda, Tokyo (JP); Keitaro Sugihara, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/688,839

(22) Filed: Nov. 19, 2019

(65) Prior Publication Data

US 2020/0086674 A1 Mar. 19, 2020

Related U.S. Application Data

(63) Continuation of application No. PCT/JP2018/021768, filed on Jun. 6, 2018.

(30) Foreign Application Priority Data

Jun. 6, 2017 (JP) .................. 2017-111731

(51) Int. Cl.
*B42D 25/21* (2014.01)
*G09F 19/16* (2006.01)
(Continued)

(52) U.S. Cl.
CPC ............. *B42D 25/21* (2014.10); *B44F 7/00* (2013.01); *G02B 5/0816* (2013.01); *G02B 5/09* (2013.01); *G02B 30/60* (2020.01); *G09F 19/16* (2013.01)

(58) Field of Classification Search
CPC .......... B42D 25/21; G02B 30/60; G02B 5/09; B02B 5/08; B44F 7/00; G09F 19/16
(Continued)

(56) References Cited

U.S. PATENT DOCUMENTS

2008/0259456 A1 10/2008 Schilling et al.
2010/0045024 A1 2/2010 Attner et al.
(Continued)

FOREIGN PATENT DOCUMENTS

DE 10 2010 047 250 A 6/2011
EP 2 946 942 A 11/2015
(Continued)

OTHER PUBLICATIONS

International Searching Authority, "International Search Report," issued in connection with International Patent Application No. PCT/JP2018/021768, dated Aug. 28, 2018.
(Continued)

*Primary Examiner* — Justin V Lewis

(74) *Attorney, Agent, or Firm* — Foley & Lardner LLP

(57) ABSTRACT

In an optical structure for displaying a stereoscopic frame image on a structure formation surface, a frame motif that displays a frame image in which reflection moves is formed on a structure formation surface, the frame motif is made up of a plurality of perforated reflecting segments, each including one or more first reflecting mirrors having a reflective layer uniformly tilted relative to the structure formation surface, the tilt angle of the first reflecting mirror is different between adjacent perforated reflecting segments so as to gradually change over a plurality of adjacent perforated reflecting segments, and at least one of the plurality of perforated reflecting segments surrounds an opening provided with no first reflecting mirror.

11 Claims, 13 Drawing Sheets

(51) Int. Cl.
  *G02B 5/09*  (2006.01)
  *G02B 5/08*  (2006.01)
  *B44F 7/00*  (2006.01)
  *G02B 30/60*  (2020.01)
  *G02B 30/00*  (2020.01)
  *G09F 19/12*  (2006.01)

(58) Field of Classification Search
  USPC ............... 283/72, 74, 94, 98, 109, 110, 901
  See application file for complete search history.

(56) References Cited

U.S. PATENT DOCUMENTS

| 2010/0270379 A1 | 10/2010 | Lister et al. |
| 2012/0319395 A1 | 12/2012 | Fuhse et al. |
| 2014/0268261 A1* | 9/2014 | Kubo ................... B42D 25/373 359/2 |
| 2016/0339733 A1 | 11/2016 | Holmes |
| 2018/0117949 A1 | 5/2018 | Fuhse |

FOREIGN PATENT DOCUMENTS

| JP | 2008-547040 A | 12/2008 |
| JP | 2009-080205 A | 4/2009 |
| WO | WO-2016/177470 A | 11/2016 |

OTHER PUBLICATIONS

International Searching Authority, "Written Opinion," issued in connection with International Patent Application No. PCT/JP2018/021768, dated Aug. 28, 2018.

Extended European Search Report dated May 18, 2020 for corresponding European Patent Application No. 18813298.9.

* cited by examiner

OPTICAL STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/021768, filed on Jun. 6, 2018, which is based upon and claims the benefit of priority to Japanese Patent Application No. 2017-111731, filed on Jun. 6, 2017; the disclosures of which are all incorporated herein by reference in their entireties.

TECHNICAL FIELD

The present disclosure describes an optical structure that displays an image stereoscopically due to reflection of light.

BACKGROUND ART

Various printed matter, such as authentication documents, securities, and banknotes, need to be resistant to counterfeiting. To make these kinds of printed matter more resistant to counterfeiting, for example, an optical structure that is difficult to counterfeit is printed on the printed matter (see, e.g., JP 2008-547040 A).

An example of an optical structure that is difficult to counterfeit is an optical structure that stereoscopically displays an image. In order to stereoscopically display an image, a 3D shape is divided on a surface perpendicular to a depth direction of the 3D shape into a plurality of sawtooth structures, like a Fresnel lens, that retain original reflection information, if the actual 3D shape is deeper than a thickness of a display medium (e.g., a film). An optical structure to which such a display method is applied makes it possible to stereoscopically display an image with great ease because there only needs to be data of the actual 3D shape to be divided.

SUMMARY OF THE INVENTION

Such a conventional optical structure, however, has the following problems.

For a 3D shape having a plurality of bars arranged with a depth therebetween, such as a birdcage, an optical structure that employs the display method described above does stereoscopically display the respective bars but loses depth information between the bars. As a result, the optical structure represents the stereoscopic bars as if they are arranged in a row, which is different from the actual 3D shape.

The present invention is made in view of such a circumstance and aims to provide a motif as an optical structure that is capable of displaying an image more realistically in a stereoscopic manner without losing depth information of a 3D shape.

To achieve the above object, the present invention takes the following means.

According to a first aspect of the invention, in an optical structure for displaying a stereoscopic frame image on a structure formation surface, a frame motif that displays a frame image in which reflection moves is formed on a structure formation surface, the frame motif is made up of a plurality of perforated reflecting segments, each including one or more first reflecting mirrors having a reflective layer uniformly tilted relative to the structure formation surface, the tilt angle of the first reflecting mirror is different between adjacent perforated reflecting segments so as to gradually change over a plurality of adjacent perforated reflecting segments, and at least one of the plurality of perforated reflecting segments surrounds openings provided with no first reflecting mirror.

Providing an optical structure of the first aspect of the present invention changes a direction in which light reflects off the first reflecting mirror for each perforated reflecting segment when an observer views a frame image displayed by a frame motif. That is, the intensity of the reflected light varies in each perforated reflecting segment, which in turn creates a stereoscopic effect. In addition, the structure described above displays a frame image whose frame motif is hollow because at least one perforated reflecting segment surrounds the openings. The first reflecting mirrors arranged in the perforated reflecting segment are still uniformly tilted on this occasion, which makes it possible to represent the frame image as a single surface.

According to a second aspect of the present invention, in the optical structure of the first aspect of the present invention, a difference in tilt angle between each adjacent one of a plurality of perforated reflecting segments constituting a frame motif is greater than zero degrees and 10 degrees or less on average.

Providing an optical structure of the second aspect of the present invention produces a shaded image due to a difference in reflection intensity between the adjacent perforated reflecting segments. In addition, observing the optical structure while tilting it causes an observer to recognize light reflecting off the optical structure to be continuously moving even if the reflection appears to move in steps, so that the image displayed by a frame motif appears stereoscopic. In particular, for a plurality of perforated reflecting segments included in the frame motif, observing the optical structure while tilting it causes an observer to recognize the image displayed by the frame motif as a smoothly curved surface if the difference in tilt angle between the adjacent perforated reflecting segments is one degree or less on average. The smaller the difference in tilt angle between the adjacent perforated reflecting segments is, the higher a degree of the curve is.

According to a third aspect of the present invention, in the optical structure of the first or second aspect of the present invention, the perforated reflecting segments are formed into a plurality of linear forms or shapes by the first reflecting mirrors.

Providing an optical structure of the third aspect of the present invention produces a continuous reflection across at least some of the plurality of linear forms when tilting the optical structure, so that the optical structure is recognized as a polyhedron.

According to a fourth aspect of the present invention, the optical structure of the third aspect of the present invention has linear forms that are 100 μm wide or more.

Providing an optical structure of the fourth aspect of the present invention, an observer visually can recognize a linear image.

According to a fifth aspect of the present invention, in the optical structure of the third or fourth aspect of the present invention, linear forms are formed in parallel to each other, each of which is spaced 100 μm or more and 1000 μm or less apart from an adjacent one.

Providing an optical structure of the fifth aspect of the present invention prevents the linear forms, in particular the linear forms aligned in parallel, recognized when the optical structure is observed, from being excessively separated from each other, so that the linear forms are less likely to be recognized as discrete elements. In addition, tilting the optical structure causes reflection to move across the linear forms, thereby making it possible to maintain its stereoscopic appearance.

A sixth aspect of the present invention determines either or both of a tilt angle and azimuth angle of the first reflecting mirror according to the direction of light reflection in a part corresponding to a reflecting surface of the first reflecting mirror in a part of original data of a frame image, in the optical structure of any one of the first to fifth aspects of the present invention.

Providing an optical structure of the sixth aspect of the present invention sets the tilt angle and azimuth angle of the first reflecting mirror based on a direction in which light reflects off each point on a polyhedron from which an image displayed by a frame motif originates. This makes it possible to reproduce reflections similar to that of the actual polyhedron, and thus enables stereoscopic representation close to that of the actual polyhedral.

According to a seventh aspect of the present invention, in the optical structure of any one of the first to sixth aspects of the present invention, an opening accounts for 10% or more and 80% or less of the perforated reflecting segments that surround the opening.

Providing an optical structure of the seventh aspect of the present invention makes it possible not to impair the stereoscopic appearance of the image displayed by a frame motif even if the frame motif has openings.

According to an eighth aspect of the present invention, in the optical structure of any one of the first to seventh aspects of the present invention, an area ratio of an opening is determined based on the tilt angle of the first reflecting mirror of the perforated reflecting segment that surrounds the opening.

Providing an optical structure of the eighth aspect of the present invention modulates the area ratio of the openings in relation to the tilt angle of the first reflecting mirror of the perforated reflecting segment that surrounds the openings. This achieves a more stereoscopic optical structure.

A ninth aspect of the present invention determines a size of an opening based on the tilt angle of the first reflecting mirror of the perforated reflecting segment that surrounds the opening, in the optical structure of any one of the first to seventh aspects of the present invention.

Providing an optical structure of the ninth aspect of the present invention modulates the size of the opening in relation to the tilt angle of the first reflecting mirror of the perforated reflecting segment that surrounds the opening. This achieves a more stereoscopic optical structure.

According to a tenth aspect of the present invention, in the optical structure of any one of the first to seventh aspects of the present invention, a size of an opening follows a size of a surface of a frame image displayed by a perforated reflecting segment that surrounds the opening.

Providing an optical structure of the tenth aspect of the present invention modulates a size of an opening in relation to a surface size of a polyhedron corresponding to a perforated reflecting segment that surrounds the opening. This achieves a more stereoscopic optical structure.

The eleventh aspect of the present invention sets the size of the plurality of openings individually in the optical structure of any one of the first to seventh aspects of the present invention.

Providing an optical structure of the eleventh aspect of the present invention makes it possible to freely set an opening of any size.

In a twelfth aspect of the present invention, a plurality of polyhedral reflecting segments that constitute a polyhedral motif that displays a stereoscopic image is arranged, in an opening in the optical structure of any one of the first to eleventh aspects of the present invention.

Providing an optical structure of the twelfth aspect of the present invention makes it appear as if a stereoscopic image were present inside the opening, thereby achieving highly designable representation in which a plurality of polyhedrons overlap with one another.

According to a thirteenth aspect of the invention, in the optical structure of the twelfth aspect of the present invention, polyhedral reflecting segments each includes a second reflecting mirror having one or more reflective layers uniformly tilted relative to the structure formation surface. The tilt angles of the second reflecting mirror are different between adjacent polyhedral reflecting segments so as to gradually change over a plurality of adjacent polygon reflecting segments.

Providing an optical structure of the thirteenth aspect of the present invention imparts a stereoscopic appearance to a stereoscopic image as well as to an image displayed by a frame motif. This achieves highly designable representation as if a second polyhedron were within a first polyhedron.

According to a fourteenth aspect of the present invention, an average difference in tilt angle between adjacent polyhedral reflecting segments in a plurality of polyhedral reflecting segments is larger than an average difference in tilt angle between adjacent perforated reflecting segments in a plurality of perforated reflecting segments, in the optical structure of the thirteenth aspect of the invention.

Providing an optical structure of the fourteenth aspect of the present invention imparts a stereoscopic appearance to both an image displaying by a frame motif and a stereoscopic image of a polyhedral motif when the optical structure is tilted, and additionally, provides a different smoothness and speed at which reflection moves, to both an image displayed by a frame motif and a stereoscopic image of a polyhedral motif. This makes it easier to recognize each of these images as a polyhedron delivering a different impression.

The optical structure of the present invention makes it possible to display an image more realistically in a stereoscopic manner without losing depth information of a 3D shape.

DETAILED DESCRIPTION OF REPRESENTATIVE EMBODIMENTS

Figure 1:
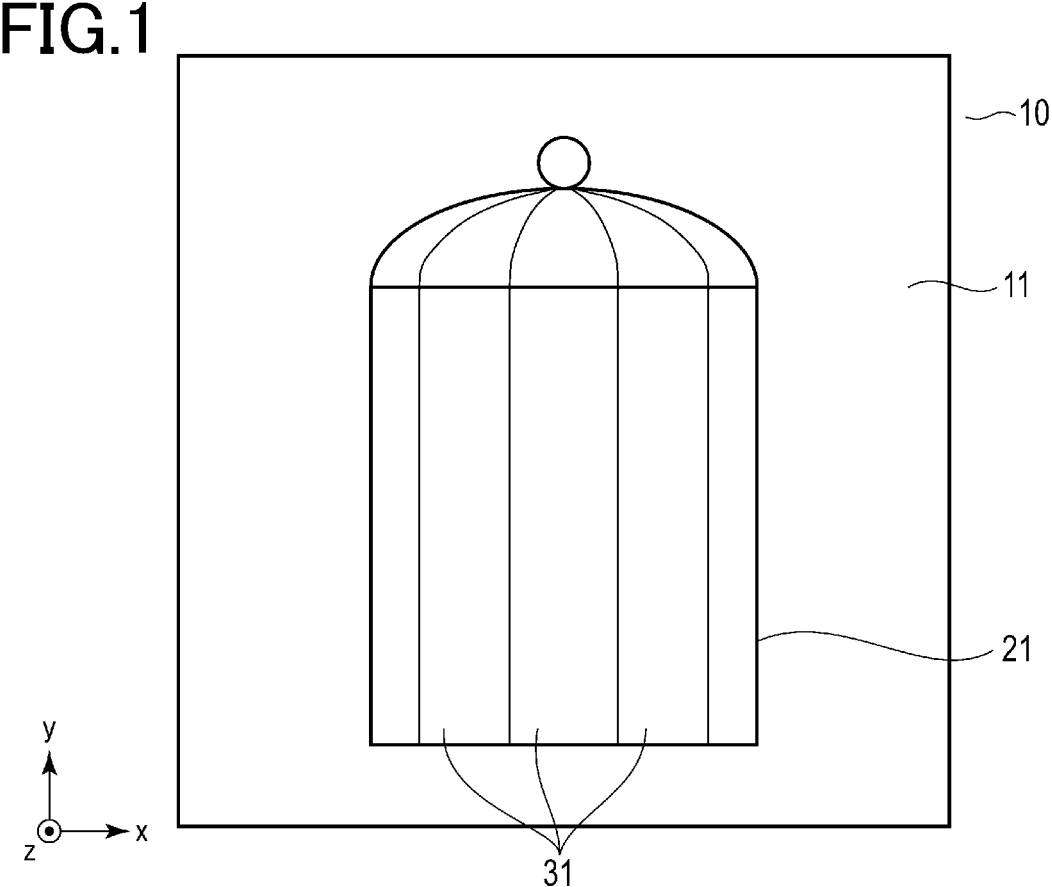
FIG. 1 is a plan view schematically illustrating how an optical structure is configured according to a first embodiment of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment of the Present Invention

An optical structure according to a first embodiment of the present invention will be described with reference to the drawings. In the following, the structure of the optical structure, the structure of a reflecting segment contained in the optical structure, and a function of the optical structure will be described sequentially.

(Description on an Optical Structure)

Now a description will be given of an optical structure according to embodiments of the present invention.

FIG. 1 is a plan view schematically illustrating an optical structure 10 according to an embodiment of the present invention.

The optical structure 10 includes a structure formation surface 11 having a frame motif 21 that is displayed stereoscopically by the optical structure 10. The frame motif 21 displays a frame image that is displayed to have a depth, i.e. a stereoscopic appearance, in a z direction.

The structure formation surface 11 includes only one frame motif 21 in the example illustrated in FIG. 1, but may include a plurality of identical or different frame motifs 21.

The frame motif 21 in FIG. 1 is, for example, a motif for stereoscopically showing a birdcage. The frame motif 21 is, however, not limited to a birdcage, but may be any images, busts, words, symbols, landmark, or the like. The frame motif 21 may also be a combination thereof.

Figure 2:
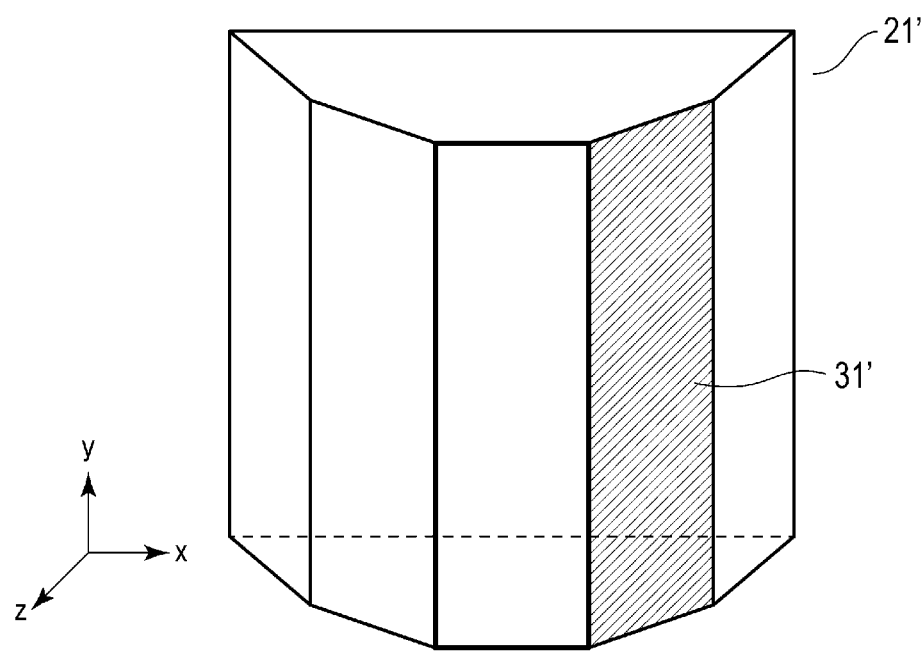
FIG. 2 is a perspective view schematically illustrating a front half of a body of a polyhedron to be displayed by an optical structure.

FIG. 2 is a perspective view of a frame image 21' displayed by the optical structure 10.

The frame motif 21 shown in FIG. 1 displays such a stereoscopic frame image 21' as shown in FIG. 2 on the two-dimensional structure formation surface 11.

The frame image 21' is made up of a plurality of perforated reflecting segment images 31'. A view of perforated reflecting segments 31 constituting the frame motif 21 in FIG. 1 corresponds to a front view of the perforated reflecting segment images 31' shown in FIG. 2.

FIGS. 1 and 2 show an example in which the perforated reflecting segments 31 and the perforated reflecting segment images 31' are rectangular. The perforated reflecting segments 31 and perforated reflecting segment images 31' are, however, not limited to being rectangular, but may be a polygon, such as a triangle or a pentagon. Additionally, a shape may be a combination of the same type or the different types of these shapes.

Such a frame motif 21 as shown in FIG. 1 may be a two-dimensional shape with such a three-dimensional frame image 21' as shown in FIG. 2 being projected at an arbitrary angle onto the structure formation surface 11. To display the frame image 21' in plan view, the frame motif 21 is required to be formed into a shape with the frame image 21' being seen in plan view. At this case, each perforated reflecting segment image 31' of the frame image 21' in FIG. 2 corresponds to each perforated reflecting segment 31 shown in the plan view of FIG. 1.

The perforated reflecting segments 31 are sized according to a spatial arrangement of the perforated reflecting segment images 31' at a case the frame image 21' is seen in plan view. Original data of the frame motif 21 represented by such an optical structure 10 shown in FIG. 1 is a vector image that displays an image using a collection of areas represented by vectors. The perforated reflecting segments 31 may also be made up of a plurality of reflecting cells in which one or more reflecting mirrors are arranged.

The reflecting cells may be small enough not to be visually recognized. A plurality of reflecting cells may each change a direction and intensity of reflected light. This enables the frame motif 21 made up of the perforated reflecting segments 31 to display a more complex image.

(Reflecting Segment Image)

Now a description will be given of a perforated reflecting segment image 31' in the embodiment of the present invention.

Figure 3A:
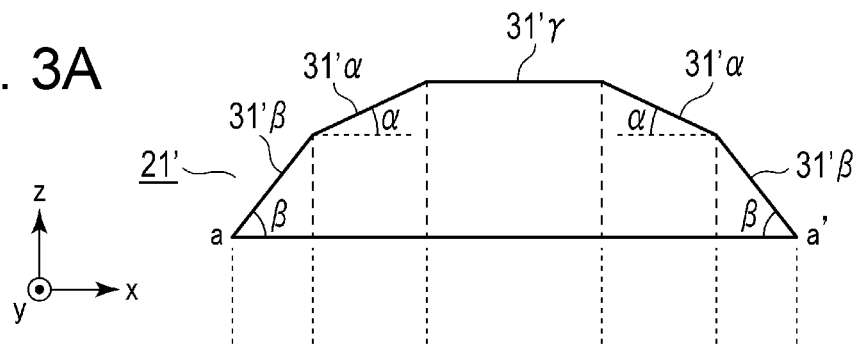
FIGS. 3A and 3B show a cross-sectional view and a front view of the polyhedron illustrated in FIG. 2.
Figure 3B:
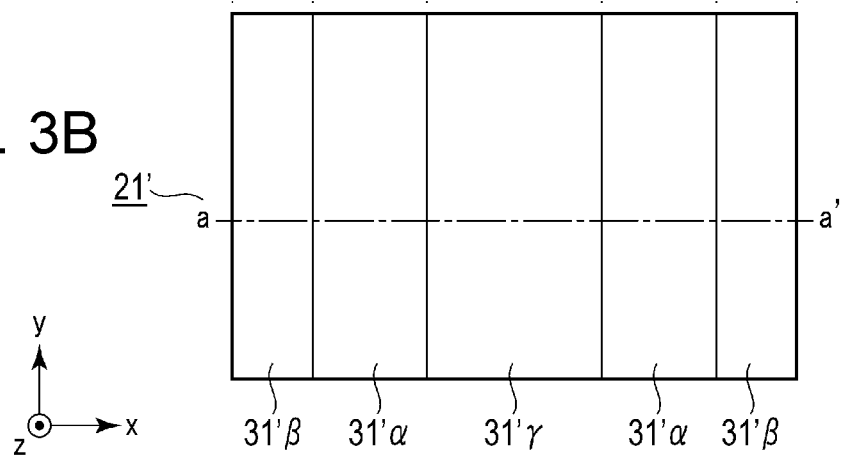

FIGS. 3A and 3B respectively show a cross-sectional view and a front view of the frame image 21' shown in FIG. 2.

Each perforated reflecting segment 31 constituting the frame motif 21 in FIG. 1 has a tilt angle relative to the structure formation surface 11. The tilt angle is equal to an angle formed by each perforated reflecting segment image 31' relative to an xy plane as shown in FIG. 2. The structure formation surface 11 is included in the xy plane.

As shown in FIGS. 3A and 3B, the frame image 21' is made up of three grating perforated reflecting segment images 31'α, 31'β, and 31'γ. The perforated reflecting segment images 31'α, 31'β, and 31'γ respectively have tilt angles α, β and 0 relative to the xy plane. These tilt angles have a relationship of 0<α<β. These tilt angles gradually vary over a plurality of adjacent perforated reflecting segment images 31'. More specifically, the tilt angles of adjacent perforated reflecting segment images 31' continuously change in the order of β, α, 0, α, and β.

Figure 4A:
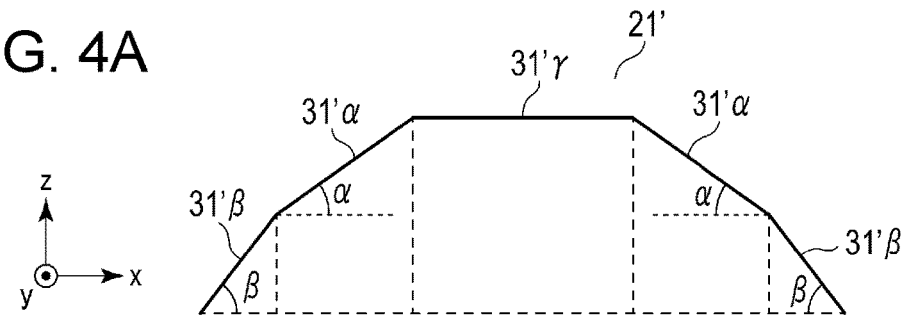
FIGS. 4A and 4B are a cross-sectional views schematically illustrating a relationship between a reflecting segment image and a reflecting segment on a structure formation surface.

FIG. 4A is a cross-sectional view illustrating an example of a relationship between the perforated reflecting segment images 31' of the frame image 21' and the perforated reflecting segments 31 on the structure formation surface 11.

Figure 4B:
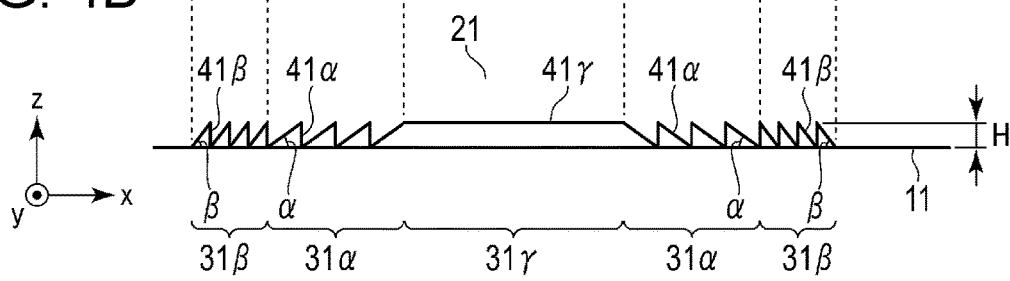

The perforated reflecting segments 31α and 31β shown in FIG. 4B correspond to the perforated reflecting segment images 31'α and 31'β shown in FIG. 4A, respectively. The perforated reflecting segments 31α and 31β shown in FIG. 4B are made up of reflecting mirrors 41α and 41β respectively having tilt angles α and β. The tilt angles α and β are equal to tilt angles α and β relatively to the xy plane in terms of the perforated reflecting segments 31α and 31β, respectively.

The perforated reflecting segment 31'γ is a plane because the perforated reflecting segment image 31'γ forms a tilt angle of 0 (zero) degree relative to the xy plane. Detailed configurations of the perforated reflecting segments 31α and 31β will be described with reference to FIGS. 5A, 5B, 6A, and 6B.

A reflecting mirror 41 of a perforated reflecting segment 31 has a reflecting surface 51. A perforated reflecting segment 31 includes one or more reflecting mirrors 41. Each reflecting mirror 41 has a reflecting surface 51.

Each reflecting mirror 41 forms a constant tilt angle relative to the structure formation surface 11 of the perforated reflecting segments 31. In other words, a tilt angle formed by a reflecting surface 51 of each reflecting mirror 41 and the structure formation surface 11 is identical in the same perforated reflecting segments 31. These tilt angles are different for each adjacent perforated reflecting segment 31.

These reflecting mirrors 41 are arranged in series if a plurality of reflecting mirrors 41 are present in the perforated reflecting segments 31.

FIGS. 5A, 5B, 6A, and 6B are perspective views each illustrating an example of reflecting mirrors 41α, 41β constituting perforated reflecting segments 31α and 31β.

Figure 5A:
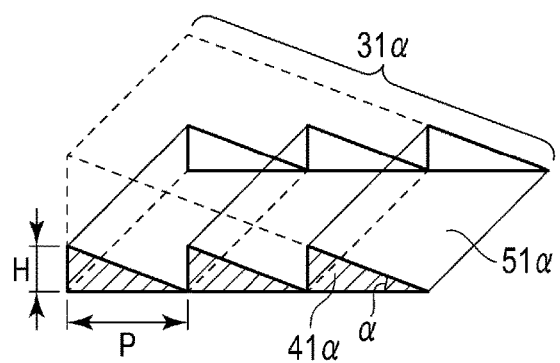
FIG. 5A is a perspective view schematically illustrating a reflecting mirror.

As shown in FIG. 5A, a plurality of wedge-shaped reflecting mirrors 41α are arranged in series with a pitch P in the perforated reflecting segment 31α. The wedge-shaped reflecting mirrors 41α each have a height H and a tilt angle α relative to the structure formation surface 11. An upper surface of each reflecting mirror 41α is a reflecting surface 51α which is to reflect light. The height H corresponds to a distance between the highest point and the lowest point of the reflecting surface 51. The reflecting mirrors 41 are arranged at the tilt angle α relative to a direction parallel to the structure formation surface 11. In FIG. 5A, the reflecting mirrors 41 each have a shape that protrudes in front of the frame motif 21 (convex shape) as if bay windows were viewed from the outside, which creates a sense of space. The reflecting mirrors 41, however, may also have a shape that recedes into the depth of the frame motif 21 (concave shape) as if bay windows were viewed from the inside, which also creates a sense of space.

In FIG. 5A, the reflecting mirrors 41α are arranged at the tilt angle α relative to the horizontal direction of the structure formation surface 11, and more than one of the reflecting mirrors 41α are columnar. Imparting the tilt angle α of each reflecting mirror 41α in a vertical direction relative to the frame motif 21 as well, however, may form a shape that protrudes toward an observer (curved convex shape). This also makes it appear as if a surface of the motif 21 were expanded by a pressure from the inside, which creates a sense of space. Conversely, a shape that recedes into a depth of the frame motif 21 (concave shape) also makes it appear as if a surface of the motif 21 were expanded by a pressure, which similarly creates a sense of space. Imparting the tilt angle only in a perpendicular direction relative to the frame motif 21 also creates a sense of space.

Figure 5B:
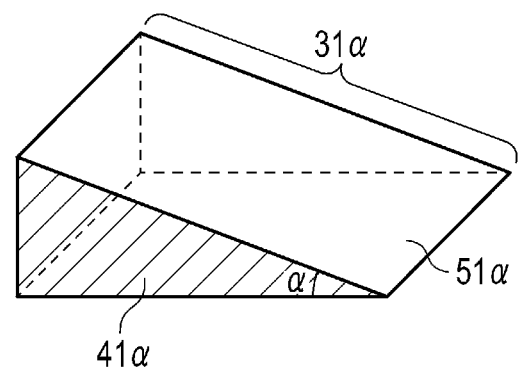
FIG. 5B is a perspective view schematically illustrating the reflecting mirror.

As shown in FIG. 5B, only a single reflecting mirror 41α is placed in a perforated reflecting segment 31α.

Figure 6A:
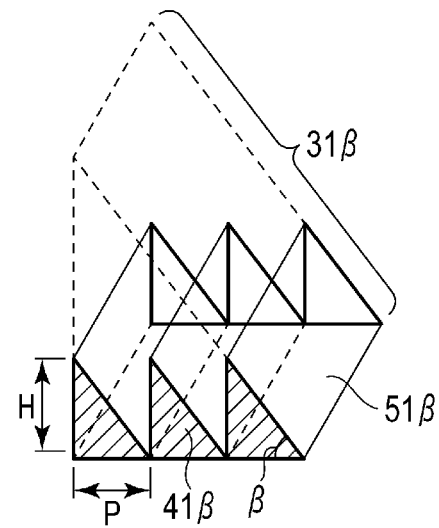
FIG. 6A is a perspective view schematically illustrating another reflecting mirror.

As shown in FIG. 6A, a plurality of wedge-shaped reflecting mirrors 41β are arranged in series with a pitch P in a perforated reflecting segment 31β. The wedge-shaped reflecting mirrors 41β each have a height H and a tilt angle β relative to the structure formation surface 11. An upper surface of each reflecting mirror 41β is a reflecting surface 51β for reflecting light.

Figure 6B:
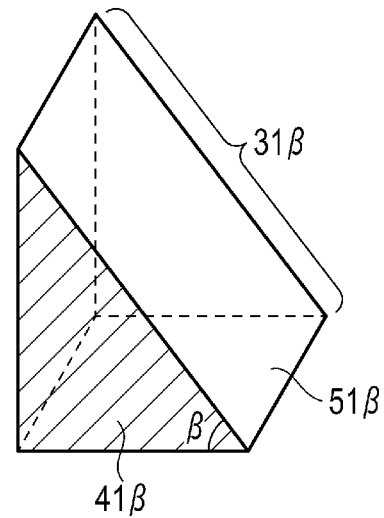
FIG. 6B is a perspective view schematically illustrating the other reflecting mirror.

As described above, the reflecting mirrors 41β shown in FIG. 6A are also arranged similarly to the reflecting mirrors 41β. Similarly, as shown in FIG. 6B, only a single reflecting mirror 41β is arranged in each perforated reflecting segment 31β.

For simplicity, FIGS. 4A and 4B illustrate only three types of perforated reflecting segment images 31'α, 31'β, 31'γ and three types of perforated reflecting segments 31α, 31β, 31γ. The perforated reflecting segment images 31' and the corresponding perforated reflecting segments 31 are, however, not limited to three types but may be more or less in number.

The perforated reflecting segments 31 included in the same frame motif 21 each have a tilt angle slightly different from a tilt angle of its adjacent perforated reflecting segment 31. These tilt angles may gradually vary over the plurality of adjacent perforated reflecting segments 31. In other words, tilt angles formed by adjacent perforated reflecting segments 31 may differ slightly from one another and may change continuously. The differences in the tilt angles formed by all the adjacent perforated reflecting segments 31 included in the same frame motif 21 may be 10 degrees or less on average.

Figure 7A:
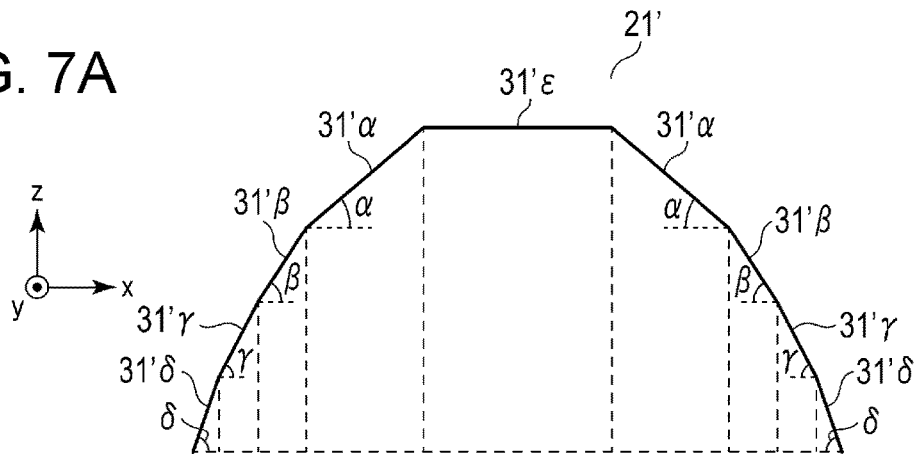
FIGS. 7A and 7B are a cross-sectional view schematically illustrating another example of a relationship between a reflecting segment image of a polyhedron and a reflecting segment on a structure formation surface.
Figure 7B:
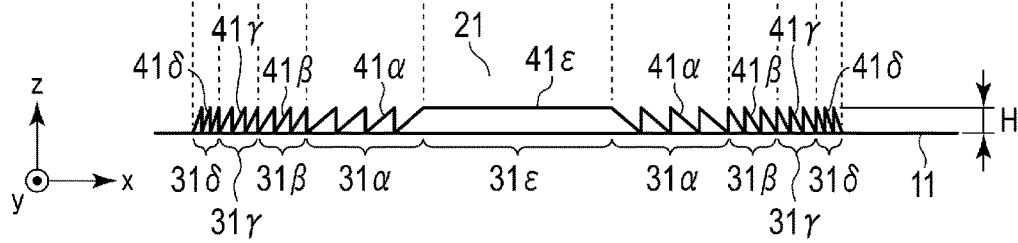

FIGS. 7A and 7B are cross-sectional views illustrating another example of a relationship between the perforated reflecting segment images 31' and the perforated reflecting segments 31 on the structure formation surface 11.

For example, the frame image 21' has five perforated reflecting segment images 31'α, 31'β, 31'γ, 31'δ, and 31'ε as shown in FIG. 7A while the frame motif 21 is made up of five perforated reflecting segments 31α, 31β, 31 γ, 31 δ and 31 ε as shown in FIG. 7B. The following description takes this configuration as an example. The frame motif 21 is formed on the structure formation surface 11 of the optical structure. The tilt angles of reflecting mirrors 41α, 41β, 41γ, 41δ, and 41ε provided in the perforated reflecting segments 31α, 31β, 31γ, 31δ, and 31ε, respectively, are tilt angles α, β, γ, δ, and 0 relative to the structure formation surface 11, respectively. These tilt angles have a relationship of $0<\alpha<\beta<\gamma<\delta$. The tilt angles are thus slightly different for each adjacent perforated reflecting segment 31.

The differences in tilt angle at the adjacent perforated reflecting segments 31 are $(\alpha-0)$, $(\beta-\alpha)$, $(\gamma-\beta)$, and $(\delta-\gamma)$. Hence the average difference is $\{(\alpha-0)+(\beta-\alpha)+(\gamma-\beta)+(\delta-\gamma)\}/4=\delta/4$. If this value is less than or equal to 10 degrees, tilting the optical structure 10 makes it appear to an observer as if reflections were continuously moving on the perforated reflecting segments 31, so that the observer sees the frame motif 21 stereoscopically.

In particular, if the perforated reflecting segments 31 constituting the same frame motif 21 form tilt angles relative to its adjacent perforated reflecting segment 31 whose difference are greater than zero degree and one degrees or less (1 degree≥δ/4>0 in this case) on average, tilting the optical structure 10 smoothens the movement of reflection on the perforated reflecting segments 31, so that an image of the frame motif 21 is visually recognized as a smooth curved frame image. The reflections of the frame motif 21 behaves identically to the reflections of the frame image 21'. The frame motif 21 thus provides a stereoscopic image.

Figure 8:
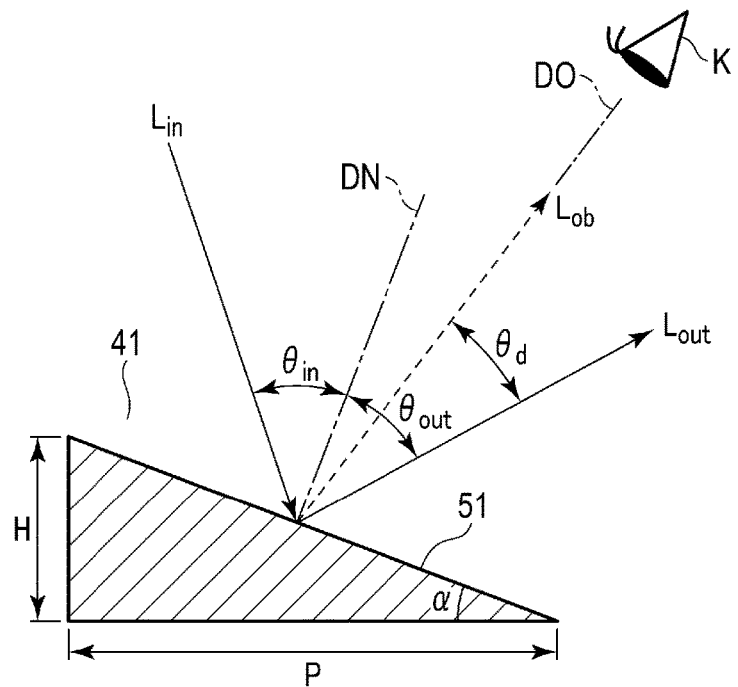
FIG. 8 is a schematic view for describing a principle of incidence and reflection of light on a reflecting surface of a reflecting mirror.

FIG. 8 is a schematic view for describing a principle of incidence and reflection of light on a reflecting surface 51 of a reflecting mirror 41.

As shown in FIG. 8, a normal direction DN relative to the reflecting surface 51 and incident light $\theta_{in}$ incident on the reflecting surface 51 form an angle $\theta_{in}$. The angle $\theta_{in}$ is an incident angle $\theta_{in}$ of the incident light Lin. The reflecting surface 51 specularly reflects the incident light Lin in a direction based on the tilt angle α.

The pitch P may be fixed or regular within the perforated reflecting segment 31. The fixed or regular pitch P may be at least 5 μm and up to 300 μm on average, and additionally, at least 5 μm and up to 100 μm. A pitch P of 5 μm or more prevents the reflecting surface 51 of each of the plurality of reflecting mirrors 41 from emerging diffracted light even if the plurality of reflecting mirrors 41 are arranged in series at a regular interval of the pitch P. Having a non-constant interval of the regular pitch Pin the plurality of reflecting mirrors 41 prevents the emission of diffracted light. As a result, an image displayed by the optical structure 10 is reproduced by light emerged from each reflecting surface 51, which is white light based on the specular reflection described above.

The resolution of the human eye is said to be approximately 100 μm when the optical structure 10 is observed from approximately 30 cm. Setting the pitch P to 100 μm or less makes it hard for an observer K who observes the optical structure 10 to visually recognize each reflecting surface 51. As a result, the observer K recognizes the perforated reflecting segment 31 as a part of each reflecting mirror 41.

Heights H of the reflecting mirrors 41 may be even within the perforated reflecting segments 31. In addition, the heights H may be even over the perforated reflecting segments 31 included in the same frame motif 21, as shown in FIGS. 4B and 7. Evening out the heights H of the perforated reflecting segments 31 included in the same frame motif 21 makes it easier to form the reflecting mirrors 41 accurately, compared to an optical structure 10 having different heights H in different perforated reflecting segments 31.

FIGS. 5A, 5B, 6A, and 6B illustrate a convex reflecting mirror 41 as an example, but the reflecting mirror 41 may be concave. Concavities and convexities of the tilt angles α of the reflecting mirrors 41 are determined according to those of the frame image 21'. An azimuth angle of each reflecting mirror 41 is determined according to the direction in which light reflects off a part on the frame image 21' corresponding to the reflecting surface 51 of each reflecting mirror 41.

The reflecting surface 51 of each reflecting mirror 41 may have a multi-layered interference layer surface. The multi-layered interference layer has a plurality of dielectric layers deposited thereon, each of which has a refractive index different from that of its adjacent dielectric layer in a direction in which the plurality of dielectric layers are deposited, thereby reflecting light having a predetermined wavelength. Thus, the optical structure 10 displays an image having a color in accordance with a wavelength of the light reflected by the multi-layered interference layer.

Each dielectric layer of the multi-layered interference layer has a refractive index different from that of its adjacent layer, thereby reflecting light incident on the multi-layered interference layer at each interface of the dielectric layer. Interference of the light reflected at each interface intensifies or attenuates light having a predetermined wavelength. The multi-layered interference layer thus emerge light having a predetermined wavelength.

Such a multi-layered interference layer may include a plurality of laminate units in which a high refractive index layer and a low refractive index layer are deposited. The high refractive index layer is formed of titanium oxide and the like, while the low refractive index layer is formed of silicon oxide and the like.

Now a description will be given of a shape of a perforated reflecting segments 31 with reference to FIGS. 9A, 9B, 9C, and 9D.

FIGS. 9A, 9B, 9C, and 9D are schematic views illustrating a shape of a perforated reflecting segment 31. A reflecting mirror 41 is arranged in an area of the perforated reflecting segment 31 of a segment shape 60.

As described above, each perforated reflecting segment 31 has a reflecting mirror 41 having a uniform tilt angle (e.g., a tilt angle α). In this case, each reflecting surface 51 specularly reflects incident light Lin in a direction based on the tilt angle α. This reflected light Lout causes a frame image to be displayed based on the segment shape 60.

FIGS. 9A, 9B, 9C, and 9D respectively illustrate segments 60A, 60B, 60C, and 60D as an example of the segment shape 60 shown in perforated reflecting segments 31A, 31B, 31C, and 31D.

Figure 9A:
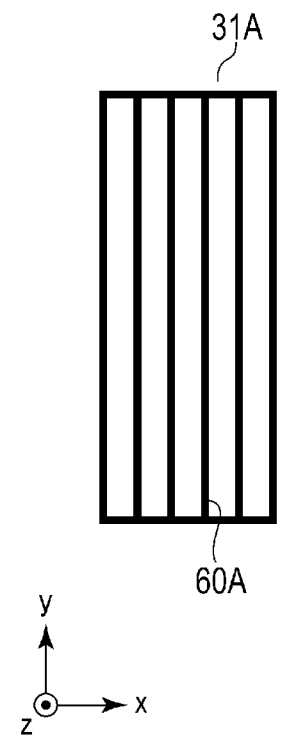
FIG. 9A is a schematic view illustrating a shape of a reflecting segment.

The segment shape 60A shown in FIG. 9A has stripes in which a plurality of linear forms are arranged parallel to one another. The segment shape 60B shown in FIG. 9B has a plurality of regularly arranged curves. The segment shape 60C shown in FIG. 9C has a geometric shape configured by a plurality of straight lines. The segment shape 60D shown in FIG. 9D has dots arranged. These dots may be arranged periodically, regularly, and randomly.

The segment shapes 60 are not limited thereto, but combining any of linear form, curved shape, free shape, and others forms a mesh pattern, a grid pattern, a lace pattern, a geometric pattern, a plant pattern, a flower pattern, a damask pattern, an arabesque pattern, a character pattern, a symbol pattern and the like. In addition, the segment shapes 60 form a pattern or the like which is a combination of the same type or the different types.

The segment shapes 60 may be a pattern, as seen in the segment shapes 60A, 60B, and 60C, that continues in a light propagation direction in the perforated reflecting segments 31 when the optical structure 10 is tilted, and a discrete pattern as seen in the segment shape 60D.

The segment shape 60 may be a mesh shape, a grid shape, a lace shape, a geometric shape, a plant shape, a flower shape, a damask shape, an arabesque shape, a character shape, or a symbol shape. The segment shape 60 may also be a combination of the same type or the different types of the above. This makes it possible to display a highly designable image.

Figure 9B:
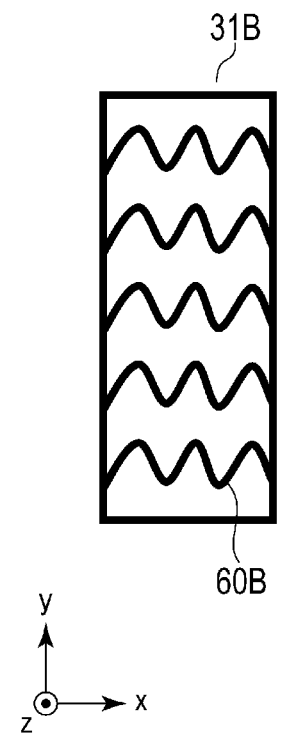
FIG. 9B is a schematic view illustrating a shape of a reflecting segment.

Such a segment shape as shown in FIGS. 9A and 9B, where linear forms have no intersection, may be 1000 µm or less apart from an adjacent linear form. This prevents each linear form from being too far apart, so that the observer K recognizes the perforated reflecting segments 31 as a surface formed integrally by the linear forms without viewing each linear form as an independent object.

Figure 9C:
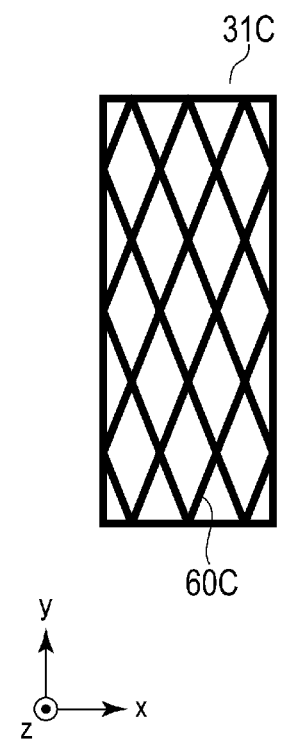
FIG. 9C is a schematic view illustrating a shape of a reflecting segment.
Figure 9D:
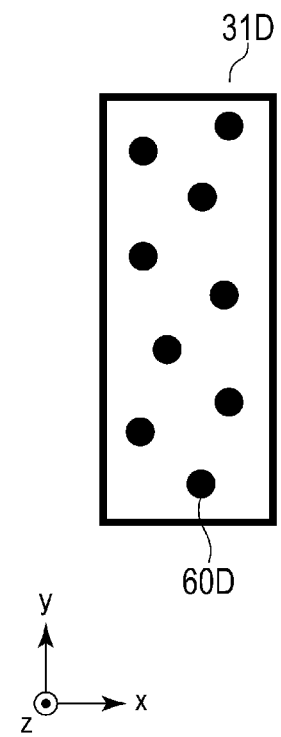
FIG. 9D is a schematic view illustrating a shape of a reflecting segment.

Such a linear form as shown in FIGS. 9A, 9B, and 9C may be 100 µm wide or more. Such a circular shape as shown in FIG. 9D may be 100 µm or more in diameter. As described above, the resolution of the human eye is said to be approximately 100 µm when the optical structure 10 is observed from approximately 30 cm. Hence if such a linear form as shown in FIGS. 9A, 9B, and 9C, and such a circular shape as shown in FIG. 9D are 100 µm or more in width or diameter, then the observer K visually recognizes the segment shape 60.

The perforated reflecting segments 31A, 31B, 31C, 31D respectively shown in FIGS. 9A, 9B, 9C, and 9D each have a reflecting mirror 41 placed only at the location of the segment shapes 60A, 60B, 60C, and 60D shown in black in the figures, as described above. In other words, no reflecting mirror 41 is placed in some part in the perforated reflecting segments 31A, 31B, 31C, and 31D. These parts serve as openings. The openings are surrounded by the perforated reflecting segments 31.

In the optical structure 10, at least one of the plurality of perforated reflecting segments 31 surrounds the opening. Each reflecting mirror 41 may include a translucent or light-shielding reflective layer, while the opening may not include a reflective layer. Alternatively, each reflecting mirror 41 may include a light-shielding reflective layer, while the opening may include a translucent reflective layer. As a result, the reflecting mirrors 41 and the perforated reflecting segments 31 reflect light and the opening transmits light, so that the opening transmits a picture pattern. This enables the optical structure 10 to represent a rich and complex image. The optical structure 10 is also applicable to print.

By attaching the optical structure 10 to print via an adhesive layer, the optical structure 10 is applied to the printed matter. The print may be what is printed on a film, a sheet, a card, or a sheet of paper. The reflecting mirrors 41 each include a translucent or light-shielding reflective layer. Providing a coating layer on a part of the reflective layer and removing the layers other than the coating layer forms a reflecting mirror 41 having no reflective layer in the opening. There are four methods of providing a coating layer on a part of the reflective layer and partially removing the reflective layer, as described below.

A first method is to partially print a coating layer on the reflecting layer. A second method is to apply a resin material that has its solubility increased or decreased by ultraviolet exposure, and then expose the material to ultraviolet light in a pattern shape before developing a coating layer. A third method is to form a coating layer after partially forming a soluble resin on the reflecting layer, and then partially remove the soluble resin and the coating layer using a solvent. A fourth method is to deposit a coating layer having a different etchant permeability on a reflective layer, and then selectively etching the coating layer and the first reflective layer by using the difference in the etchant permeability.

Figure 10:
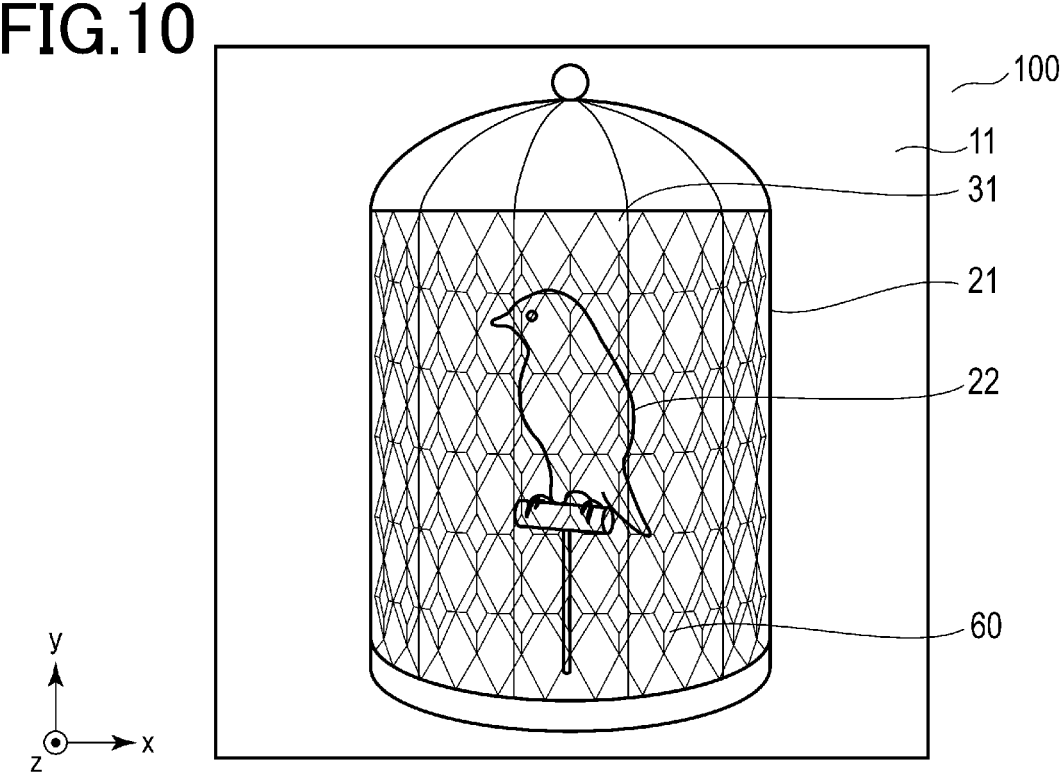
FIG. 10 is a plan view schematically illustrating an optical structure in which a polyhedral motif is placed inside openings.

FIG. 10 is a plan view schematically illustrating an optical structure in which a polyhedral motif is placed inside openings.

As shown in FIG. 10, the pattern of a segment shape 60 displayed in a perforated reflecting segment 31 may be identical or similar in all the perforated reflecting segments 31 having segment shapes 60. This allows reflection to move continuously and consistently when the optical structure 100 is tilted, which makes it possible to represent a natural stereoscopic appearance.

On the other hand, the pattern of a segment shape 60 displayed in a perforated reflecting segment 31 may not necessarily be identical or similar in all the perforated reflecting segments 31 having segment shapes 60. Such an optical structure 100 displays a more complex image than an optical structure having an identical or similar pattern in all the perforated reflecting segments 31 having segment shapes 60. A stereoscopic appearance of the frame motif 21 is achieved by controlling a tilt angle of a reflecting mirror 41 constituting each perforated reflecting segment 31 regardless of the pattern of the segment shape 60. Providing different segment shapes 60 in the perforated reflecting segments 31, therefore, improves designability while maintaining a certain stereoscopic effect.

Now a description will be given of a function of an optical structure according to such a first embodiment of the present invention as described above.

The frame motif 21 is made up of a plurality of perforated reflecting segments 31. A tilt angle of each reflecting mirror 41 placed on the perforated reflecting segments 31 is a tilt angle relative to an xy plane of a perforated reflecting segment image 31' of an original frame image 21'. An azimuth of the reflecting mirror 41 is determined according to a direction in which light reflects at a part on the frame image 21' corresponding to the reflecting surface 51. The frame motif 21 is thus made up of reflecting mirrors 41 having various tilt angles and azimuth angles. Hence when light is incident on the optical structure 10 from a predetermined direction, reflected light travels in various directions and various degrees of light intensity enter the eyes of the observer K.

As described with reference to FIG. 8, if incident light Lin is incident from a predetermined direction on the reflecting mirror 41 having the tilt angle α, a normal direction DN of the reflecting surface 51 of the reflecting mirror 41 is determined by the tilt angle α of the reflecting mirror 41. An adjacent perforated reflecting segment 31 (not shown) has a slightly different normal direction DN. Therefore, the frame motif 21 formed in the optical structure 10 is visually recognized as a stereoscopic image.

An incidence angle $\theta_{in}$ of the incident light Lin and a reflection angle $\theta_{out}$ of the reflected light Lout are angles relative to the normal direction DN, and are both symmetric thereto. If an observation direction DO, which is a direction in which the observer K views the optical structure 10, is the same as a direction in which the reflected light Lout is emerged, the observer K recognizes the perforated reflecting segment 31 most brightly.

Generally, the optical structure 10 is assumed to be observed under sunlight, indoor fluorescent light, or the like. The reflected light Lout is emerged with a spatial and intensity distribution. Observation light Lob, which is a reflected light component emerged in the observation direction DO, therefore enters the eyes of the observer K even if the observation direction DO fails to coincide with the direction in which the reflected light Lout is emerged. The smaller an angle difference $\theta_d$ between the reflected light $L_{out}$ and the observation light $L_{ob}$ is, the larger the intensity of the observation light Lob is. Therefore, the observer K perceives the perforated reflecting segments 31 as being brighter.

Each perforated reflecting segment 31 thus has a unique tilt angle and normal direction DN, and takes a value whose angle differences $\theta_d$ between the reflected light Lout and the observation light $L_{ob}$ are different. As a result, the observer K recognizes the frame motif 21 as an image that is given a stereoscopic appearance, by a plurality of perforated reflecting segments 31 each having a different light intensity.

In addition, expanding the perforated reflecting segments 31 increases a difference between adjacent tilt angles, creating more jagged pattern. Conversely, shrinking the perforated reflecting segments 31 reduces a difference between adjacent tilt angles, creating a pattern that appears smoother.

An image displayed by the frame motif 21 has one or more areas in which no reflecting mirror 41 is placed, i.e., one or more perforated reflecting segments 31 that surround an opening. As shown in FIG. 10, by placing a polyhedral motif 22 inside the openings, the polyhedral motif 22 such as a bird is arranged in the frame motif 21, which is in this case a birdcage. In addition, each perforated reflecting segment 31 has a different tilt angle, thereby controlling a reflection direction displayed for each perforated reflecting segment 31. As a result, the perforated reflecting segment 31 therefore serves as a single perforated reflecting segment 31 even if a part thereof is an opening. Thus, the frame motif 21 never impairs its stereoscopic appearance.

In addition, appropriately determining a pattern and interval of the segment shapes 60 formed on the perforated reflecting segments 31 in consideration of such optical characteristic as described above creates an effect that reflections continuously moves when tilting the optical structure 10 while recognizing a perforated reflecting segment 31 as a single face that is different from an adjacent perforated reflecting segment 31. As described above, a stereoscopic appearance is represented by a difference in brightness between each perforated reflecting segment 31 when the optical structure 10 is observed from a predetermined observation angle. As is the case with an actual stereoscopic object, a stereoscopic appearance is also imparted by light continuously moving on the frame motif 21 when the optical structure 10 is tilted.

Further, if there is a large difference in tilt angle between adjacent perforated reflecting segments 31, each perforated reflecting segment 31 shines independently when the optical structure 10 is tilted, so that the observer feels no continuity. As described above, however, if the difference in tilt angle between adjacent perforated reflecting segments 31 is 10 degrees or less on average, movement of reflection is recognized as visually continuous movement even if the reflection appears to move discretely between adjacent perforated segments 31. Thus, the frame motif 21 is recognized stereoscopically. In particular, if the difference in tilt angle between the adjacent perforated reflecting segment 31 is one degree or less on average, reflection moves continuously, so that the frame motif 21 is recognized as a polygonal shape made of a smooth curved surface. Thus, adjusting the tilt angle of each perforated reflecting segment 31 controls the moving speed of light, that is, fineness and coarseness of the movement of the reflection. Therefore, a predetermined curving degree of a frame image 21' is accomplished.

The optical structure according to the embodiment of the present invention makes it possible to display an image more realistically and stereoscopically without losing depth information of its 3D shape.

Second Embodiment of the Present Invention

An optical structure according to a second embodiment of the present invention will be described with reference to the drawings. In the following, the structure of the optical structure, the structure of a reflecting segment contained in the optical structure, and a function of the optical structure will sequentially be described. The symbols in the drawings used in the following description are denoted by the same reference numerals as those described in the first embodiment of the present invention to avoid a duplicate description.

(Description on an Optical Structure)

With reference to FIG. 10, an optical structure according to an embodiment of the present invention will now be described.

FIG. 10 is a plan view schematically illustrating an optical structure in which a polyhedral motif is placed inside openings.

An optical structure 100 includes a structure formation surface 11 having a frame motif 21 and a polyhedral motif 22 as a motif that displays the stereoscopic image shown in FIG. 10. In FIG. 10, the frame motif 21 represents a birdcage, while the polyhedral motif 22 represents a bird in the birdcage.

Similarly to FIG. 1, the frame motif 21 is made up of a plurality of perforated reflecting segments 31. Reflecting mirrors 41 are arranged in the perforated reflecting segments 31 in correspondence with such a geometric segment shape as shown in FIG. 9C.

In addition, a second reflecting mirror of a polyhedral reflecting segment 32 of the polyhedral motif 22 is placed in an area in which a first reflecting mirror 41 of a perforated reflecting segment 31 of the frame motif 21 is not placed, i.e., in openings, in order to display a bird as if it were in the birdcage. The first reflecting mirror and the second reflecting mirror may be similar reflecting mirrors.

The optical structure 100 shown in FIG. 10 shows an example in which the structure formation surface 11 includes both the frame motif 21 and the polyhedral motif 22, but the structure formation surface 11 may also include three or more motifs. In addition, all of these plurality of motifs may be different or identical, or only some thereof may be identical.

The polyhedral motif 22 is not limited to a bird, but may be busts, landmarks, images, words, symbols, and the like, and a combination thereof.

Figure 11:
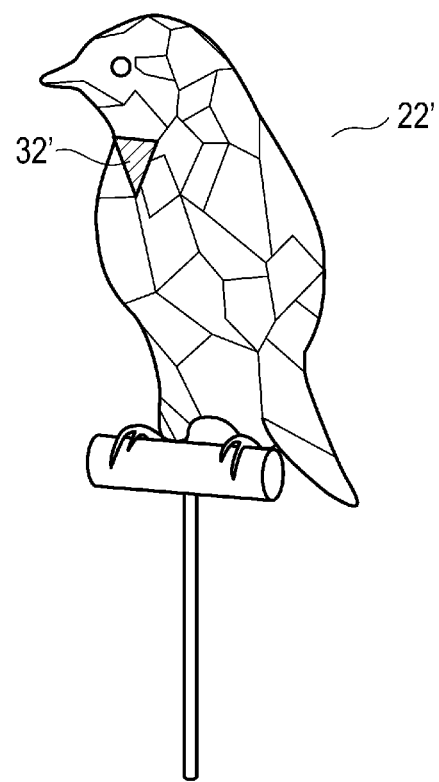
FIG. 11 schematically illustrates a polyhedral image to be placed inside the openings.

FIG. 11 shows an example of a polyhedral image to be placed in openings.

FIG. 11 shows a polyhedral image 22' displaying a bird displayed by the polyhedral motif 22. The polyhedral motif 22 shown in FIG. 10 displays a three-dimensional polyhedral image 22' on a two-dimensional structure formation surface 11, as shown in FIG. 11.

As with the frame image 21', the polyhedral image 22' is also made up of a plurality of polyhedral reflecting segment images 32'. Each polyhedral reflecting segment image 32' is polygonal in contour. In FIG. 11, the polyhedral reflecting segment image 32' is triangular in shape, but the shape is not limited to a triangle, but may be a polygon, such as a triangle and a pentagon. The shape may also be defined by a circular, elliptical, or other curve. Alternatively, a shape may be a combination of the same type or the different types of these shapes. Original data of the frame motif 21 and the polyhedral motif 22 displayed by the optical structure 10 is a vector image represented by a collection of areas defined by vectors. The polyhedral reflecting segment 32 may be shaped as a polygon, such as a triangle and a pentagon. The polyhedral reflecting segment 32 may also be defined by a circular, elliptical, or other curve. Alternatively, a shape may be a combination of the same type or the different types of these shapes. The polyhedral reflecting segment 32 may also be made up of a plurality of reflecting cells in which one or more reflecting mirrors are arranged. The reflecting cells may be small enough not to be visually recognized. A plurality of reflecting cells may each change a direction and intensity of reflected light. This enables the frame motif 22 made up of the polyhedral reflecting segments 32 to display a more complex image.

(Reflecting Segment Image)

Now a description will be given of a reflecting segment image in the embodiment of the present invention.

Figure 12:
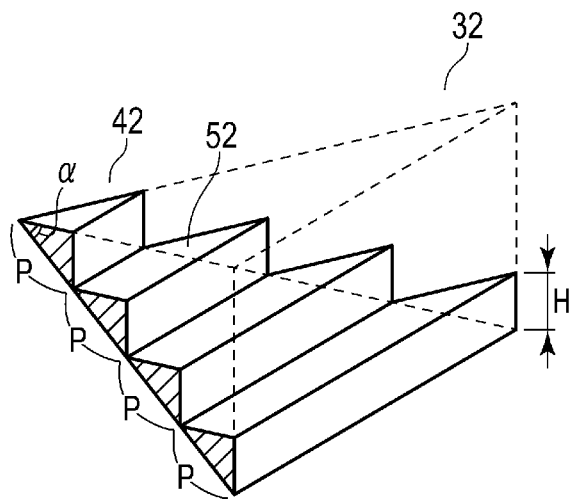
FIG. 12 is a perspective view schematically illustrating a reflecting segment corresponding to a reflecting segment image constituting the polyhedral image illustrated in FIG. 11.

FIG. 12 is a perspective view of a polyhedral reflecting segment 32 corresponding to a polyhedral reflecting segment image 32' that configures the polyhedral image 22' shown in FIG. 11.

A reflecting mirror 42 of the reflecting segment 32 has a reflecting surface 52. The reflecting segment 32 includes one or more reflecting mirrors 42. Each reflecting mirror 42 has a reflecting surface 52.

A tilt angle formed by the reflecting surface 52 of each reflecting mirror 42 and the structure formation surface 11 is identical in the same reflecting segment 32. Each adjacent reflecting segment 32 has a different tilt angle.

As shown in FIG. 12, these reflecting mirrors 42 is arranged in series if a plurality of reflecting mirrors 42 are present in a single reflecting segment 32. These reflecting mirrors 42 may have a fixed or regular height H and pitch P. The fixed or regular pitch P may be at least 5 μm and up to 300 μm on average, and more preferably, at least 5 μm and up to 100 μm. An at least 5-μm pitch P prevents the reflecting surface 52 of each reflecting mirror 42 from emerging diffracted light even if the plurality of reflecting mirrors 42 are arranged in series at a fixed and regular pitch P. Having an irregular interval of the regular pitch P of the plurality of reflecting mirrors 42 prevents the emission of diffracted light. As a result, an image displayed by the optical structure 100 is reproduced by light emerged from each reflecting surface 52, which is white light based on the specular reflection described above.

An average difference between tilt angles in adjacent reflecting segments 32 of all the reflecting segments 32 forming the polyhedral motif 22 may be greater than an average difference between tilt angles in adjacent reflecting segments 32 of all the reflecting segments 32 forming the frame motif 21.

Adjacent reflecting segments each have a different reflection intensity, which creates a shadow in the frame motif 21 and the polyhedral motif 22 and causes reflections moving on the perforated reflecting segments 31 and the polyhedral reflecting segments 32 to appear continuous when the viewer K tilts the optical structure 100, so that the frame motif 21 and the polyhedral motif 22 both appear stereoscopic. In addition, the reflection move on the reflecting segments 31 of the frame motif 21 more smoothly than the reflection move on the reflecting segments 32 of the polyhedral motif 22 and the two motifs present different reflecting characteristics, so that the frame motif 21 and the polyhedral motif 22 are recognized as different motifs.

For the reflecting segments 32, an angle $\theta_{in}$, which is formed by a normal direction DN of the reflecting surface 52, and a direction in which an incident light Lin which is incident on the reflecting surface 52, is an incident light Lin, which is determined by an angle at which the observer K observes the optical structure 100 and a position of a light source at a time the observer K observes the same, as described with reference to FIG. 8. The reflecting surface 52 specularly reflects the incident light Lin in a direction based on a tilt angle.

As with the perforated reflecting segments 31, the pitch P is fixed within an identical reflecting segment 32 and may be 5 μm or more and 300 μm or less for a reason similar to one described with reference to the perforated reflecting segments 31. In addition, the pitch P may be 5 μm or more and 100 μm or less. This prevents reflecting mirrors 42 from being individually distinguished by the observer K who observes the optical structure 100. As a result, the observer K recognizes the reflecting segment 32 as a part of each reflecting mirror 42.

If the pitch P of a reflecting segment is 5 μm or more, no diffracted light is emerged from each reflecting surface 52 even if a plurality of reflecting mirrors 42 are arranged evenly spaced apart. As a result, an image displayed by the optical structure 100 is reproduced by light emerged from each reflecting surface 52, which is white light based on the specular reflection described above.

On the other hand, if an optical structure has reflecting segments each having a pitch P that is less than 5 μm, diffracted light is emerged from a plurality of reflecting surfaces arranged evenly spaced apart, which causes the polyhedral motif 22 to be visually recognized as an image assuming a different color depending on observation angles. If an optical structure has a pitch P of 5 μm or more, a grating structure having a pitch of less than 5 μm may be overlapped with the reflecting surfaces 52.

A diffraction grating having an optical structure pitch P that ranges from 0.8 μm or more to 5 μm or less presents rainbow colors created by diffracted light, while a sub-wavelength grating having a pitch P that is less than 0.8 μm presents a color of a wavelength corresponding to the pitch P in a specular reflection.

Overlapping a diffraction grating structure with some the reflecting surfaces 52 or with some areas of the reflecting surfaces 52 enables gradation expression. In addition, changing a grating structure pitch for each reflecting segment or between adjacent reflecting surfaces 52 within a reflecting segment makes it possible to display a different color for each reflection unit, and also mixed colors.

The reflecting mirrors 41 and 42 constituting the frame motif 21 and the polyhedral motif 22 may both have a pitch P that is 5 μm or more and 300 μm or less, or either one thereof may have a pitch that is less than 5 μm. In the former case, the frame motif 21 and the polyhedral motif 22 are displayed in white or in a color having an identical attribute of a chromatic color (rainbow colors), so that the optical structure 100 appears uniform as a whole. In the latter case, the frame motif 21 and the polyhedral motif 22 are displayed in white and a chromatic color whose attributes are different from each other, which makes it easier to recognize the motifs as different motifs, and in turn provides higher designability.

As with the perforated reflecting segments 31, the height H may be equal in all the reflecting segments 32. This makes it possible to form a shape of each reflecting mirror 42 precisely in a step of forming the reflecting mirror 42, compared to the case where different reflecting segments 32 each have a different height H.

The tilt angle of the reflecting mirror 42 may correspond to a concavo-convexity of the frame image 22'. In addition, the reflecting mirror 42 may be shaped in triangular prism on the structure formation surface 11. The reflecting mirror 42 may be convex or concave.

The reflecting surface 52 of the reflecting mirror 42 may have a multi-layered interference layer surface. The multi-layered interference layer has a plurality of dielectric layers deposited thereon, each of which has a refractive index different from that of its adjacent dielectric layer in a direction in which the plurality of dielectric layers are deposited, thereby reflecting light having a predetermined wavelength.

This enables the optical structure 100 to display an image having a color in accordance with a wavelength of the light reflected by the multi-layered interference layer.

Figure 13A:
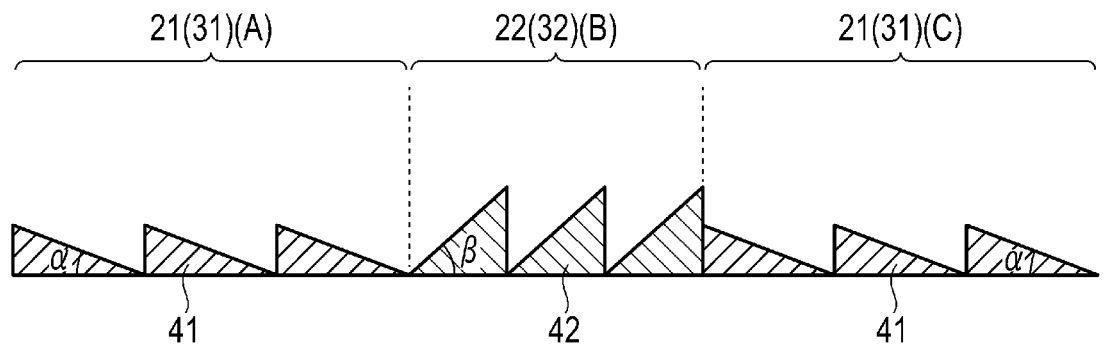
FIG. 13A is a cross-sectional view schematically illustrating an example of a cross-sectional structure in a reflecting segment containing two motifs.

FIG. 13A shows an example of a cross-sectional structure in an area in which the frame motif 21 and the polyhedral motif 22 are displayed adjacent to each other. The perforated reflecting segments 31 of the frame motif 21 include a reflecting mirror 41 in areas A and C that display the segment shape 60. An opening B of the segment shape 60 includes a reflecting mirror 42 of a reflecting segment 32 of the polyhedral motif 22.

The cross-sectional view illustrated in FIG. 13A schematically shows a structure having a polyhedral reflecting segment 32 within the perforated reflecting segment 31 of the structure formation surface 11, as shown in FIG. 10. The reflecting mirrors 41 arranged in the areas A and C, therefore, have an equal tilt angle α. However, if the area C includes a plurality of perforated reflecting segments 31 that form the frame motif 21, a reflecting mirror 41 having a unique tilt angle is arranged in each perforated reflecting segment 31.

The perforated reflecting mirrors 41 are not arranged as shown in FIG. 13A in an area in which the frame motif 21 is not displayed, such as an opening B of a segment shape 60 of the reflecting segments 31. This is because there is no perforated reflecting segment 31. The reflecting mirrors 41 and 42 are thus formed on the structure formation surface 11 in accordance with an arrangement of the perforated reflecting segments 31 and the polyhedral reflecting segments 32 that display each motif.

Figure 13B:
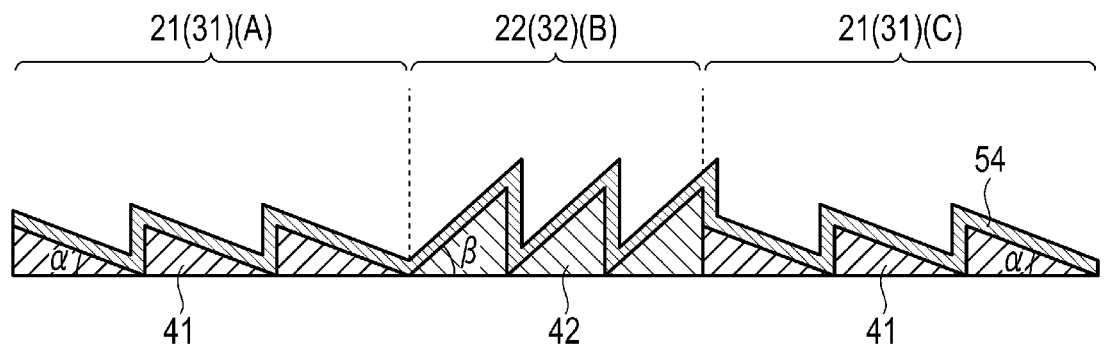
FIG. 13B is a cross-sectional view schematically illustrating another example of a cross-sectional structure in a reflecting segment containing two motifs.

FIG. 13B shows another example of a cross-sectional structure in an area in which the frame motif 21 and the polyhedral motif 22 are displayed adjacent to each other.

In the cross-sectional structure shown in FIG. 13B, surfaces of the reflecting mirrors 41 and 42 shown in FIG. 13A are covered by a reflective layer 54. The reflective layer may be translucent or light-shielding. A translucent reflective layer may be a dielectric layer, while a light-shielding layer may be a metal layer, Examples of a metal of the reflective layer include aluminum.

Covering the surfaces of the reflecting mirrors 41 and 42 with the reflective layer 54 displays both the frame motif 21 and the polyhedral motif 22 more glossily.

Figure 13C:
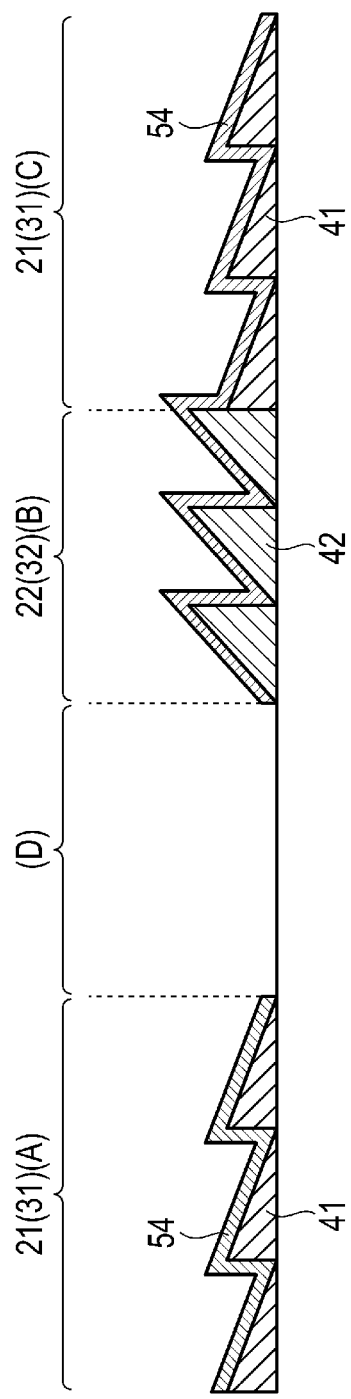
FIG. 13C is a cross-sectional view schematically illustrating yet another example of a cross-sectional structure in a reflecting segment containing two motifs.

FIG. 13C shows yet another example of a cross-sectional structure in an area in which the frame motif 21 and the polyhedral motif 22 are displayed adjacent to each other.

In the cross-sectional structure shown in FIG. 13C, the area A and the area B shown in FIG. 13B are separated apart by an area D having neither a reflecting mirror nor a reflective layer.

As described in FIG. 13B, the surfaces of the areas A, B and C are covered by the reflective layer 54, thereby being displayed glossily. On the other hand, a surface of the area D appears dark because the area D has neither a reflecting mirror nor a reflective layer and therefore reflects no light. The presence of an area that appears dark, such as the area D, makes it possible to accentuate brightness of the areas A and B, which are adjacent to the area D. Another picture may be provided in an area with no the reflective layer 54. The picture may be printed or formed using other method.

Figure 13D:
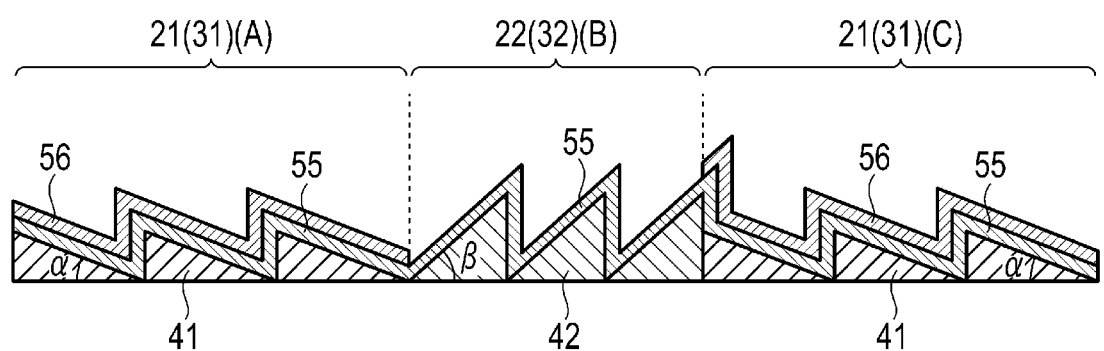
FIG. 13D is a cross-sectional view schematically illustrating even yet another example of a cross-sectional structure in a reflecting segment containing two motifs.

FIG. 13D shows even yet another example of a cross-sectional structure in an area in which the frame motif 21 and the polyhedral motif 22 are displayed adjacent to each other.

In the cross-sectional structure shown in FIG. 13D, the surfaces of the reflecting mirrors 41 and 42 shown in FIG. 13A are covered by a tranlucent reflective layer 55 and/or a light-shielding reflective layer 56. In the areas A, B, and C, the translucent reflective layer 55 covers the surfaces of the reflecting mirrors 41. Additionally in the areas A and C, the light-shielding reflective layer 56 covers a surface of the translucent reflective layer 55. This means that a first reflecting mirror is covered by the translucent reflective layer 55 and the light-shielding reflective layer 56. On the other hand, the second reflecting mirror is covered by the translucent reflective layer 55. The reflective layer may be translucent or light-shielding. The translucent reflective layer may be a dielectric layer, while the light-shielding layer may be a metal layer, Instances of the metal of the reflective layer include aluminum. Instances of a dielectric material of the reflective layer include titanium oxide.

The areas A and C, whose surfaces are covered by the light-shielding reflective layer 56, appear bright due to reflection of light. On the other hand, the area B, whose surface is covered by the translucent reflective layer 55, reflects part of the incident light but transmits part of the incident light, which is reflected by the reflecting mirrors 42. This causes the frame motif 21 to appear bright but the polyhedral motif 22 to appear relatively dark.

Thus, by appropriately selecting an arrangement of the reflecting mirrors 41 and 42, presence or absence of a reflective layer, and characteristics of a reflective layer, how the frame motif 21 and the polyhedral motif 22 appear can be changed.

Figure 14A:
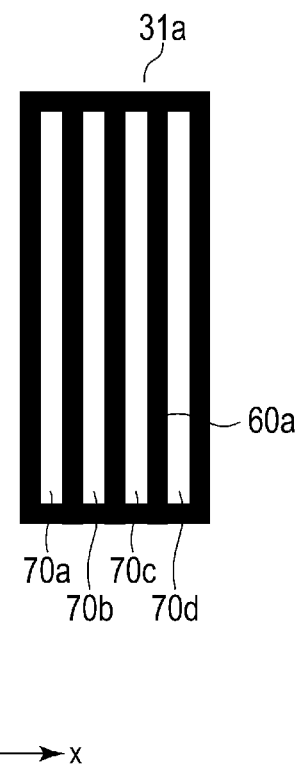
FIG. 14A is a front view schematically illustrating the structure of one of several reflecting segments with different aperture ratios.
Figure 14B:
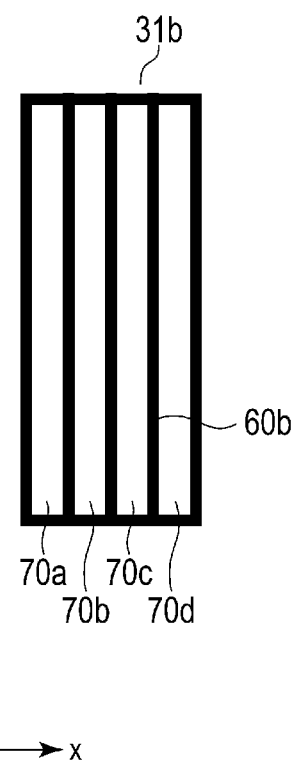
FIG. 14B is a front view schematically illustrating the structure of one of several reflecting segments with different aperture ratios.
Figure 14C:
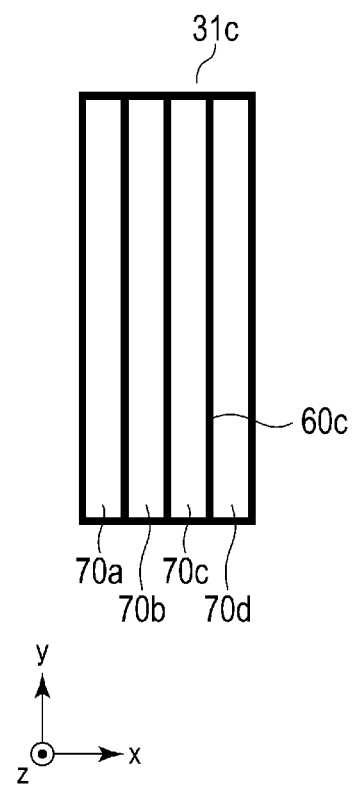
FIG. 14C is a front view schematically illustrating the structure of one of several reflecting segments with different aperture ratios.

FIGS. 14A, 14B, and 14C are front views illustrating structures of several reflecting segments each having a different aperture ratio.

A description will be given of an area of a segment shape 60 formed in the perforated reflecting segments 31 with reference to FIGS. 14A, 14B, and 14C. FIGS. 14A, 14B, and 14C each show a segment shape 60 with a longitudinal stripe pattern, as an example. Perforated reflecting segments 31a, 31b, and 31c have segments 60a, 60b, and 60c, respectively. These perforated reflecting segments 31a, 31b, and 31c are, however, each different in size of an area in which the segment shapes 60 are not displayed, i.e., openings 70 in the perforated reflecting segments 31.

The openings refers to an area in which no perforated reflecting segment 31 is formed, such as openings 70a, 70b, 70c, and 70d in FIGS. 14A, 14B, and 14C. A ratio of the total area of the openings (70a+70b+70c+70d) to the area of the perforated reflecting segments 31 is here referred to as an aperture ratio in the perforated reflecting segment 31.

As shown in FIG. 10, in an optical structure 100 in which the polyhedral motif 22 is present inside the frame motif 21, perforated reflecting segments 31 that form the frame motif 21 may have an aperture ratio that ranges from 10% to 80%. This makes it possible to display the polyhedral motif 22 observed through the openings 70 of the segment shape 60 to an extent that an outline of the polyhedral motif 22 is recognized.

There is no need for all the perforated reflecting segments 31 surrounding the openings 70 to have an identically patterned segment shape 60. The different aperture ratio of the perforated reflecting segment 31 may be different. A part of the polyhedral motif 22 is covered by the frame motif 21 so as not to be displayed, but if 50% or more of an original area of the polyhedral motif 22 is displayed at a time when the optical structure 100 is observed, then the observer K complements the polyhedral motif 22 from the displayed information and recognizes an entire image thereof.

The segment shape 60 is not limited to examples such as the segments 60a, 60b, and 60c having a longitudinal stripe pattern shown in FIGS. 14A, 14B and 14C, respectively, but may have such a pattern as segment shapes 60A, 60B, 60C, and 60D shown in FIGS. 9A, 9B, 9C, and 9D, respectively, if the segment shape 60 has an aperture ratio that ranges from 10% to 80%.

The area ratio of the openings 70 can also be determined based on a tilt angle of the first reflecting mirror 41 of the perforated reflecting segments 31 surrounding the openings 70. In addition, the size of the openings 70 can also be determined based on a tilt angle of the first reflecting mirror 41 of the perforated reflecting segments 31 surrounding the openings 70. Further, the size of the openings 70 may follow the size of perforated reflecting segment images 31' corresponding to perforated reflecting segments 31 having the openings 70. Further, the size of each of a plurality of openings 70 may also be individually set. This achieves a more stereoscopic optical structure 100.

Now a description will be given of a function of an optical structure according to such second embodiment of the present invention as described above.

For an optical structure according to this embodiment of the present invention, a first reflecting mirror 41 is placed in areas A and C where the segment shape 60 is displayed, and a second reflecting mirror 42 constituting a polyhedral motif 22 is placed in an opening B of the segment shape 60, as shown in FIG. 13. The areas A and C and the opening B all belong to the perforated reflecting segments 31 forming the frame motif 21. Thus, placing the reflecting mirrors 42 forming the polyhedral motif 22 in an area where the reflecting mirrors 41 constituting the frame motif 21 are not placing, makes the polyhedral motif 22 appear as if it were present inside the frame motif 21.

In addition, the frame motif 21 and the polyhedral motif 22 are both made up of a plurality of perforated reflecting segments 31 and a plurality of polyhedral reflecting segments 32 and both create a stereoscopic effect. This enables the observer K to perceive an object such as a cage containing another stereoscopic object such as a bird.

A reflecting mirror 41 forming the frame motif 21 and a reflecting mirror 42 forming the polyhedral motif 22 may have different tilt angles, with respect to the reflecting mirrors provided in the perforated reflective segments 31 and the polyhedral reflecting segments 32, adjacent with each other. In addition, an average difference in tilt angles formed by all the adjacent polyhedral reflecting segments 32 included in the same polyhedral motif 22 is larger than an average difference in tilt angles formed by all the adjacent perforated reflecting segments 31 included in the same frame motif 21.

The differences in the tilt angles formed by the reflecting mirrors of all the adjacent reflecting segments included in the same motif are related to movement of the reflection coming from each reflecting segment entering eyes of the observer K when the optical structure 100 is tilted. The smaller these differences are, the smoother the reflection moves, which means that the reflecting segments are recognized as smoother curved surfaces. Significantly increasing these angle differences between the frame motif 21 and the polyhedral motif 22 makes it easier to recognize the frame motif 21 and the polyhedral motif 22 as different images, and additionally makes it possible to impart a depth to a positional relationship between the two motifs.

[Method of Producing an Optical Structure, and Configuration and Materials of the Same]

A method of producing the optical structures 10 and 100 described above includes a step of forming a concavo-convex structure layer and a step of forming a reflective layer on a surface of the concavo-convex structure layer. In the step of forming the concavo-convex structure layer may be a step of reproducing a concavo-convex structure layer from an original plate.

The original plate is produced by applying a photosensitive resist onto one surface of a planar substrate, and then irradiating the photosensitive resist with light for partial exposure thereof, followed by developing the photosensitive resist. The original plate is then electroformed to produce a metal stamper that is used as a matrix to form a concavo-convex structure layer. The metal stamper may also be produced by cutting a metal substrate using a lathe technique.

The concavo-convex structure layer may be formed, for example, by thermal embossing, casting, and photopolymerization. Photopolymerization involves casting a radiation curable resin between a flat film carrier such as a plastic film, and a metal stamper. The radiation curable resin is then cured by irradiation before the cured resin layer is released from the metal stamper together with the carrier. Compared with pressing or casting using a thermoplastic resin, photopolymerization forms the structure of the reflecting mirrors 41 and 42 precisely and produces more thermally and chemically resistant reflecting mirrors 41 and 42.

The concavo-convex structure layer is formed, for instance, of a polymer resin. The polymer resin may be a thermoplastic polymer resin and a curable polymer resin. The curable polymer resin may be a thermosetting polymer resin or a radiation-curable polymer resin, and a thermosetting/radiation curable polymer resin. The material of the concavo-convex structure layer may further contain a curing agent, a plasticizer, a disperser, various leveling agents, a UV absorber, an antioxidant, a viscosity modifier, a lubricant, a light stabilizer, and the like alone or in mixture.

The polymer resins described above may contain a poly (meth)acrylic resin, a polyurethane resin, a fluororesin, a silicone resin, a polyimide resin, an epoxy resin, a polyethylene resin, a polypropylene resin, a methacrylic resin, a polymethylpentene resin, a cyclic polyolefin resin, a polystyrene resin such as an acrylonitrile-(poly)styrene copolymer (AS resin) and acrylonitrile-butadiene-styrene copolymer (ABS resin), a polyvinyl chloride resin, a polycarbonate resin, a polyester resin, a polyamide resin, a polyamide-imide resin, a polyaryl phthalate resin, a polysulfone resin, a polyphenylene sulfide resin, a polyether sulfone resin, a polyethylene naphthalate resin, a polyether imide resin, an acetal resin, a cellulose resin and the like, the polymer resins being single or copolymer resins, mixed resins, or composite resins as a base material. These resins may be applied alone or two or more thereof may be applied in a mixture as a material of the concavo-convex structure layer. The concavo-convex structure layer may have a thickness that ranges from 0.5 µm to 20 µm.

A reflective layer may be formed by deposition. Instances of deposition for forming a reflective layer include physical vapor deposition such as vacuum deposition, sputtering, ion plating, and ionized-cluster beam deposition, and chemical vapor deposition such as plasma chemical vapor deposition, thermochemical vapor deposition, and photochemical vapor deposition. By applying these methods alone or in combination, a reflective layer that is a multi-layered interference layer is deposited.

Among these methods, vacuum deposition and ion plating are more productive than the other methods and easily forms a quality reflective layer. Processing conditions under which to use physical vapor deposition and chemical vapor deposition may be selected depending on what material the reflective layer is formed of.

A light-shielding reflective layer may be a metal layer. The metal may be a pure metal or an alloy. The reflective layer may be made of a pure metal such as aluminum, gold, silver, platinum, nickel, tin, chromium, and zirconium or an alloy thereof. A dielectric layer of the reflective layer may be made of an inorganic compound if the reflective layer is the multi-layered interference layer described above. The reflective layer may be made of an inorganic compound if the reflective layer is translucent. The translucent reflective layer may be a dielectric layer. The inorganic compound may be a silica or metal compound. The metal compound may be a metal oxide, a metal sulfide, a metal fluoride, a metal nitride, or the like. The metal of the metal compound may be aluminum, zinc, titanium, calcium, magnesium, zirconium, or tantalum. The metal oxide may be a zinc oxide, a titanium oxide, or the like. The metal sulfide may be zinc sulfide, or the like. The reflective layer may be made of either aluminum or silver because of their higher reflectance in the visible light region than that of other materials. The reflective layer may have a thickness from 10 nm to 1,000 nm.

(Modification 1)

The embodiments of the present invention described above may be modified as follows.

The structure formation surface 11 may include a plurality of pixels, and each perforated reflecting segment 31 may be a single pixel. For instance, the plurality of pixels may be arranged in a matrix on the structure formation surface 11. In other words, original data of an image displayed by optical structures 10 and 100 is not limited to a vector image, but may be a raster image represented by repetition of a unit area pixel.

According to the above description, each reflecting segment may be formed based on a raster image.

(Modification 2)

The perforated reflecting segments 31 and the polyhedral reflecting segments 32 may not only be polygonal as described above but also be circular or be shaped defined by a curve of an elliptical and other shape, and additionally, be shaped defined by a curve of a semi-circular or semi-elliptical shape, or a straight line. The plurality of perforated reflecting segments 31 and the plurality of polyhedral reflecting segments 32 may also include either or both of a reflecting segment whose contour is defined by a curve, and a reflecting segment whose contour is defined by a curve and a straight line, in addition to a polygonally contoured reflecting segment. The plurality of perforated reflecting segments 31 and the plurality of polyhedral reflecting segments 32 may also be both a reflecting segment whose contour is defined by a curve, and a reflecting segment whose contour is defined by a curve and a straight line.

Even such a structure, in an observation direction, displays one of a plurality of images having an intensity of light based on a normal direction DN of a reflecting surfaces 51 and 52 respectively at each of the perforated reflecting segments 31 and the polyhedral reflecting segments 32, as long as each of the perforated reflecting segments 31 and the polyhedral reflecting segments 32 each forms an image and the structure formation surface 11 forms an image unique to the optical structures 10 and 100 using the plurality of perforated reflecting segments 31 and the plurality of the polyhedral reflecting segments 32.

(Modification 3)

In each of the perforated reflecting segments 31 and the polyhedral reflecting segments 32, a height H of each of the reflecting mirrors 41 and 42 may be different from the heights of all the other reflecting mirrors 41 and 42. Such a structure is acceptable as long as each of the perforated reflecting segments 31 and the polyhedral reflecting segments 32 each forms an image, and the optical structures 10 and 100 display images of the frame motif 21 and the polyhedral motif 22 unique to the optical structures 10 and 100 in an observation direction.

The reflecting mirrors 41 and 42 may have two reflecting surfaces instead of a single reflecting surface 51 and a single reflecting surface 52.

Figure 15:
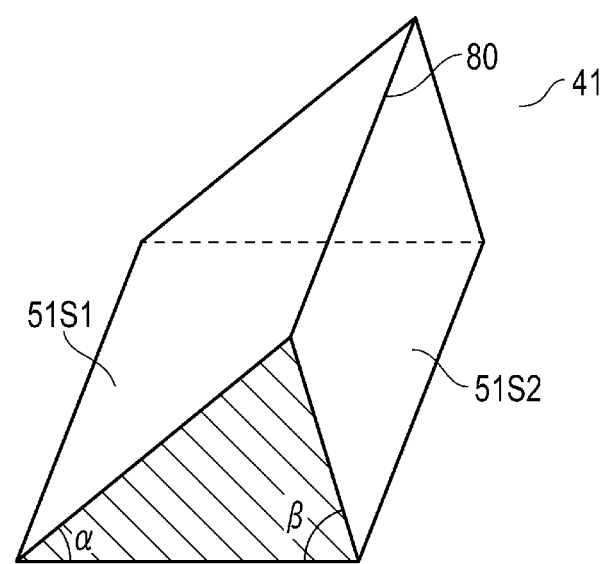
FIG. 15 is a perspective view schematically illustrating a modification of a reflecting mirror.

For instance, as shown in FIG. 15, the reflecting mirror 41 may include a first reflecting surface 51S1 and a second reflecting surface 51S2. The first and second reflecting surfaces 51S1 and 51S2 share a single side 80, which defines each of these reflecting surfaces. The first reflecting surface 51S1 and the structure formation surface 11 form a first tilt angle $\alpha$, while the second reflecting surface 51S2 and the structure formation surface 11 form a second tilt angle $\beta$. The first tilt angle $\alpha$ is smaller than the second tilt angle $\beta$, but may be made larger than or equal to the second tilt angle $\beta$.

Such a structure is acceptable as long as one perforated reflecting segment 31 having a plurality of reflecting mirrors 41 displays one image on each perforated reflecting segment 31 in the observation direction using a plurality of unidirectionally oriented first reflecting surfaces 51S1 or a plurality of unidirectionally oriented second reflecting surfaces 51S2.

The present invention should not be limited to the embodiments described above, but various modifications may be made thereto when implemented, without departing from the spirit of the present invention. In addition, the embodiments may be implemented in combination wherever possible. In this case, the combination should exert advantageous effects accordingly. Further, the embodiments of the present invention described above include aspects of the present invention. The plurality of disclosed configurations can be appropriately combined to obtain various aspects of the invention.

What is claimed is:

1. An optical structure, comprising:
an optical structure for displaying a stereoscopic frame image on a structure formation surface;
a frame motif that displays a frame image in which a reflection moves, the frame motif being formed on the structure formation surface;
the frame motif is made up of a plurality of perforated reflecting segments;
each of the perforated reflecting segments employs one or more first reflecting mirrors having a reflective layer, wherein each of the one or more reflecting mirrors of a perforated reflecting segment of said plurality has a uniform tilt angle relative to the structure formation surface;
a difference in a tilt angle of the one or more first reflecting mirrors between adjacent perforated reflecting segments of said plurality is more than zero degrees and 10 degrees or less on average to gradually vary the tile angle over the adjacent plurality of perforated reflecting segments; and
at least one of the plurality of perforated reflecting segments surrounds an opening provided with no first reflecting mirror.

2. The optical structure of claim 1, wherein:
the perforated reflecting segment is formed in a plurality of linear forms, by the first reflecting mirror.

3. The optical structure of claim 2, wherein:
each of the linear forms of said plurality of linear forms is 100 μm wide or more.

4. The optical structure of claim 3, wherein:
two linear forms of said plurality of linear forms are formed in parallel to each other, and the linear forms formed in parallel are each spaced apart from an adjacent linear form by 100 μm or more and 1000 μm or less.

5. The optical structure of claim 1, wherein:
an area ratio of the opening to the perforated reflective segment that surrounds the opening is 10% or more and 80% or less.

6. The optical structure of claim 1, wherein:
an area ratio of the opening is determined based on a tilt angle of the first reflective mirror of the perforated reflective segment that surrounds the opening.

7. The optical structure of claim 1, wherein:
a size of the opening is determined based on a tilt angle of the first reflecting mirror of the perforated reflecting segment that surrounds the opening.

8. The optical structure of claim 1, wherein:
a size of the plurality of openings is individually set.

9. The optical structure of claim 1, wherein:
a plurality of polyhedral reflecting segments constituting a polyhedral motif that displays a stereoscopic image are arranged inside the opening.

10. The optical structure of claim 9, wherein:
each of the polyhedral reflecting segments employs a second reflecting mirror having one or more reflective layers having a uniform tilt angle relative to the structure formation surface; and
a tilt angle of the second reflective mirror is different between the adjacent polyhedral reflective segments so as to gradually vary over the plurality of adjacent polyhedral reflective segments.

11. The optical structure of claim 10, wherein:
an average difference in tilt angle between the adjacent polyhedral reflective segments in the plurality of polyhedral reflecting segments is greater than an average difference in tilt angle between adjacent perforated reflecting segments in the plurality of perforated reflecting segments.

* * * * *